Dec. 6, 1949 S. W. HAYES Re. 23,180
WHEEL STOP
Original Filed April 17, 1944 4 Sheets-Sheet 1
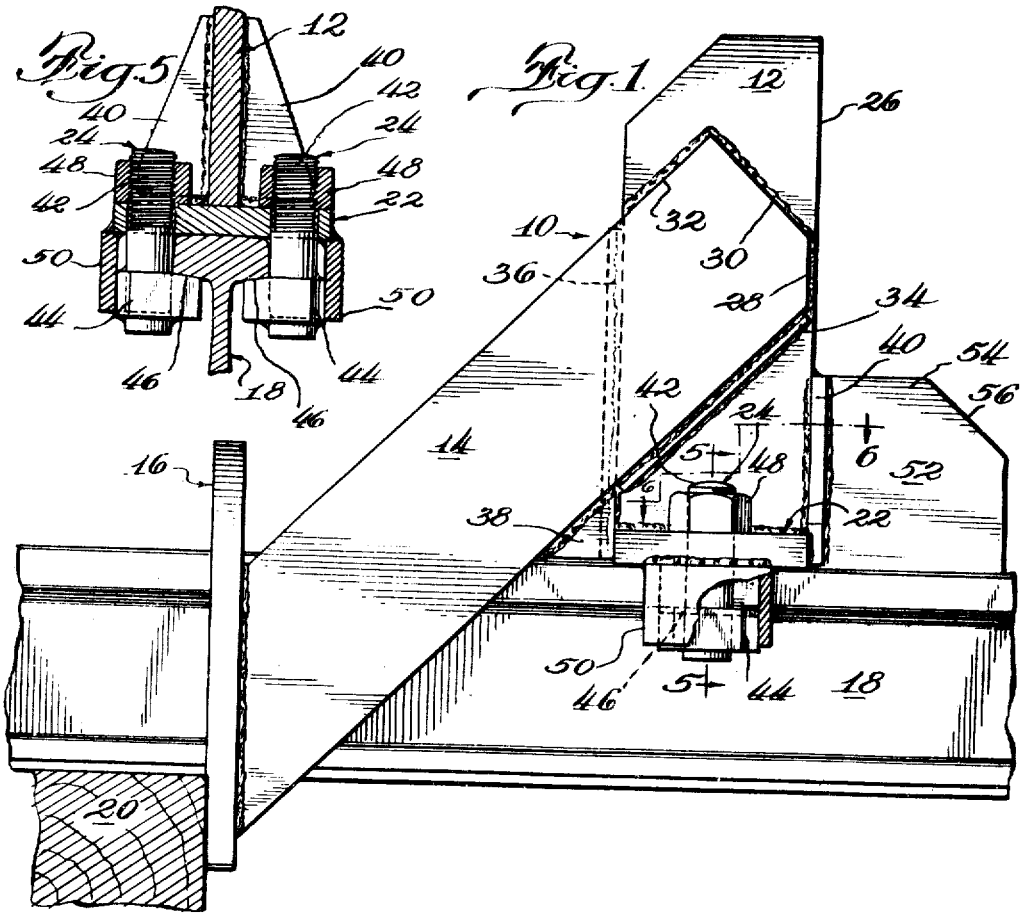
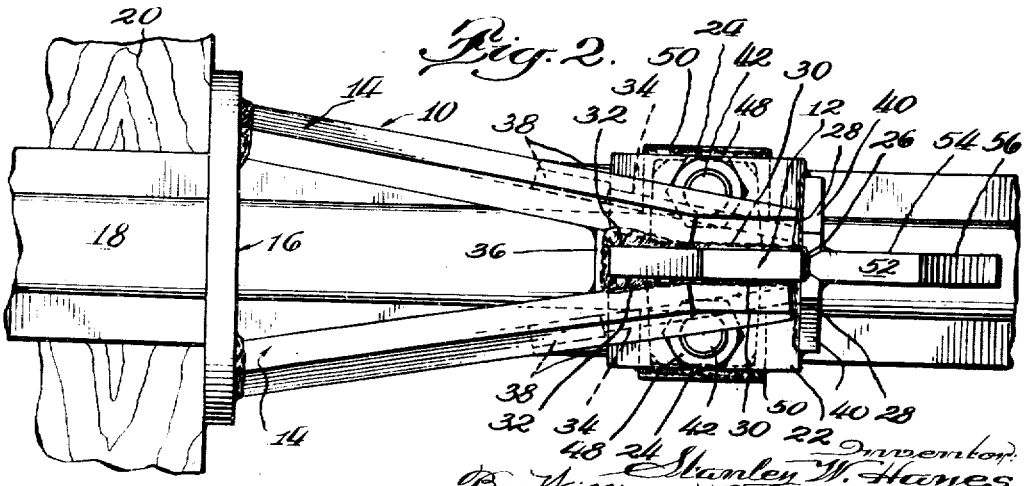
Inventor
Stanley W. Hayes
By Williams, Bradbury & Hamble
Attorneys.

Dec. 6, 1949
S. W. HAYES
WHEEL STOP
Re. 23,180
Original Filed April 17, 1944
4 Sheets-Sheet 2
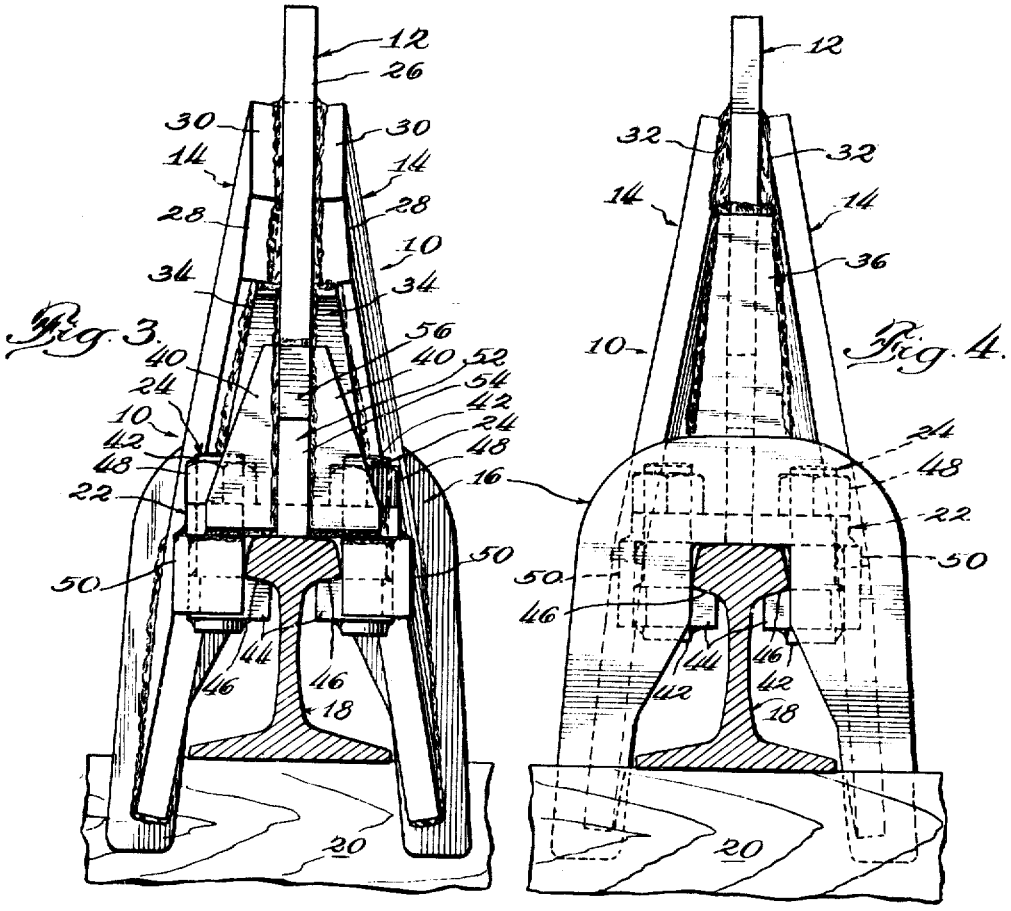
Inventor:
Stanley W. Hayes
By Williams, Bradbury & Hinkle
Attorneys.

Dec. 6, 1949 S. W. HAYES Re. 23,180

WHEEL STOP

Original Filed April 17, 1944 4 Sheets-Sheet 3

Inventor:
Stanley W. Hayes
By Williams, Bradbury & Huckle
Attorneys.

Inventor:
Stanley W. Hayes
By Rickle, Horton, Ahlberg, Hausmann & Kupper
attorneys Reissued Dec. 6, 1949

Re. 23,180

UNITED STATES PATENT OFFICE 23,180

WHEEL STOP

Stanley W. Hayes, Richmond, Ind., assignor to Hayes Track Appliance Company, Richmond, Ind., a corporation of Indiana Original No. 2,441,193, dated May 11, 1948, Serial No. 531,415, April 17, 1944. Application for reissue November 29, 1948, Serial No. 62,582

37 Claims. (Cl. 104—258)

Matter enclosed in heavy brackets [ ] appears in the original patent but forms no part of this reissue specification; matter printed in italics indicates the additions made by reissue The present invention is directed to the improvement and simplification of wheel stops, of the type commonly referred to as scotch blocks, or the like, used on railway tracks. More particularly, it is directed to a type of wheel stop adapted to slide along the rail and provided with portions extending below the base of the rail into abutting relationship with the ties, although certain features of the invention are applicable to stops fixedly secured to rails so that they will not slide. This application is a continuation in part of my now abandoned application Serial No. 459,136, filed September 21, 1942.

Wheel stops constructed with portions extending below the base of the rail and arranged to slide along the rail under car wheel impact provide a cushion stop for the car wheels because the force of the impact is transmitted to the ties and to the ballast. When the stop is struck by a moving car wheel, it moves along the rail and moves the tie and may even compress the tie somewhat so that there is provided a shock absorbing resistance that minimizes damage to either the car or the rails or to the stop itself.

The primary object of the present invention is to provide a new and improved wheel stop that may be constructed both simply and economically and which is rugged in construction.

A further object of the present invention is the provision of a new and improved wheel stop constructed primarily from metal bars which may have a width, for instance, of about six inches as distinguished from prior art wheel stops which have been customarily constructed of steel plates.

A further object of the present invention is the provision of a new and improved wheel stop constructed of bars and which possesses considerable strength and rigidity so that it may be safely used on railways.

Another object of the present invention is the provision of a new and improved wheel stop comprising a pair of wheel abutments of different heights and spaced lengthwise of the rail with the lower abutment forward of the higher one and so constructed and arranged relative to each other that wheels may strike both abutments substantially simultaneously at all speeds or first the lower and then the higher abutment, depending on the speed of the wheel.

Another and more specific object of the present invention is the provision of a new and improved wheel stop comprising a pair of wheel abutment surfaces located at different heights lengthwise of the rail, with the lower abutment forward of the upper one and so configured and arranged relative to each other that a wheel strikes the lower forward abutment only or the forward abutment first and then the upper abutment whereby the weight of the wheel and the load thereon acts on the lower projection to counteract the overturning moment acting upon the wheel stop.

Another more specific object of the present invention is the provision of a new and improved wheel stop comprising a pair of wheel abutments of different heights and spaced lengthwise of the rail with the lower abutment forward of the higher one and so constructed that a wheel of normal size strikes both abutments substantially simultaneously at all speeds and that wheels of smaller size strike the lower abutment or both abutments, depending on the speed of the wheel, and whereby the lower forward wheel abutment provides a downward component of force that reduces the overturning moment applied to the stop as a result of car wheel impact.

Other objects and advantages of the invention will become apparent from the ensuing description in the course of which reference is had to the accompanying drawings, in which:

Fig. 1 is a side elevational view of one embodiment of a wheel stop embodying the present invention;

Figs. 2, 3 and 4 are plan, front, and rear elevational views, respectively, of the stop;

Fig. 5 is a fragmentary vertical cross-sectional view taken along the line 5—5 of Fig. 1 and illustrating details of holding means provided to hold the stop in position on a rail;

Figure 6:
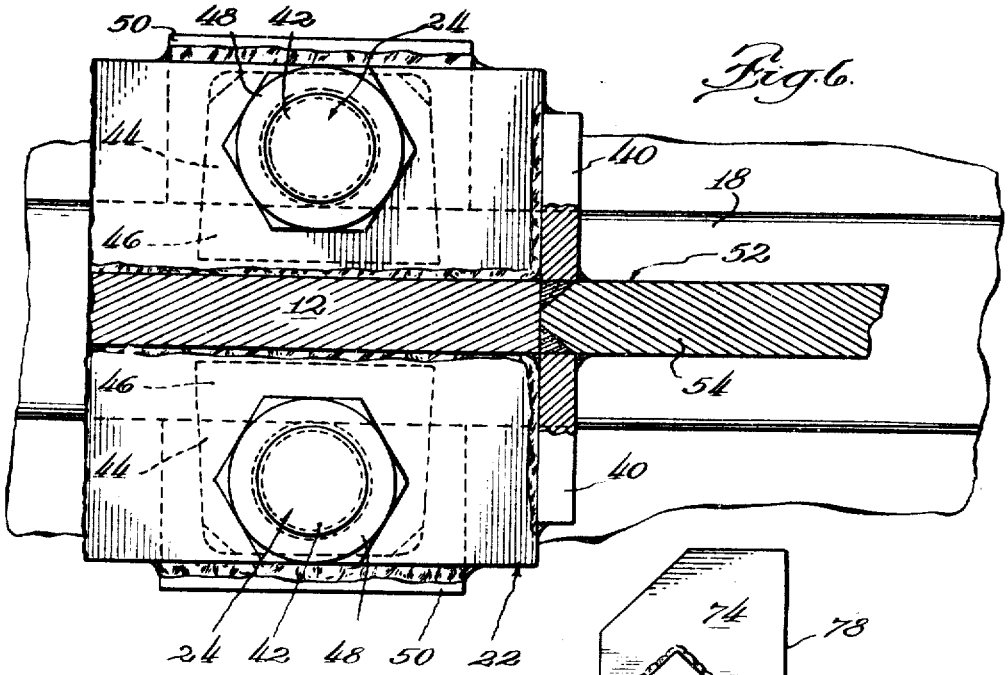
Fig. 6 is a fragmentary enlarged horizontal cross-sectional view taken along the line 6—6 of Fig. 1.

Referring first to Figs. 1 to 4, inclusive, it may be noted that the wheel stop of the present invention illustrated therein has been indicated as a whole by reference character 10. While only one stop has been illustrated, it is contemplated that two stops will be utilized in the usual installation, one stop for each rail.

The wheel stop of the present invention is characterized by a number of novel features, among which may be mentioned (1) the construction of the various component parts of the stop of metal bars as distinguished from plates; (2) the provision of two wheel abutments of different heights and the spacing of these lengthwise of the rail; and (3) the abutment surface of the higher and rearmost abutment is such that a wheel has no tendency to rise therealong, at least when moving forward (i. e., rearwardly as far as the stop is concerned), and the forward and lower abutment surface is such that a wheel may rise therealong.

The wheel stop illustrated in Figs. 1 to 7c, inclusive, includes a wheel abutment constituted primarily by a vertically disposed metal bar 12, a pair of diverging and downwardly and rearwardly extending bars 14 and a generally U-shaped saddle 16 disposed in inverted position and straddling the rail 18. The forward ends of bars 14 are secured, as by welding, to the sides of the vertical bar above the rail 18 and the rear ends of the bars are secured in abutting relation to the saddle at substantially the level of the rail, although the lower extremities of the bars and saddle extend below the base of the rail into abutting relation with a tie 20, as best indicated in Fig. 1.

The vertically disposed bar 12 preferably has a thickness of about one inch, a width of about six inches, and it rises to a height of sixteen and three-quarters inches above the top of the rail, i. e., a height greater (only slightly greater in this particular embodiment) than the radius of the normal size railroad car wheel, which has a diameter of thirty-three inches. It rests upon and is secured, as by welding, to a horizontal bar 22 disposed transversely of and extending beyond the sides of the rail head to receive holding means 24 located at opposite sides of the stop, and which will be described in detail shortly. The forward edge 26 of the bar defines a vertical wheel abutment or striking surface.

The diverging bars 14 are disposed at an angle of about 45 degrees from horizontal. The forward ends are welded along the edges 28, 30 and 32 (see Fig. 1) to the sides of the vertical bar, and the rear ends are welded to the front side of the saddle 16, whereby the vertical bar, the diverging bars, and saddle are united to form a unitary structure.

The rigidity and strength of the stop are enhanced by utilizing braces to form a box-like structure at the junction of the vertical and diverging bars. Diagonal braces 34 of generally triangular shape are secured to the lower edges of bars 14 and to the vertical bar and a rear brace 36 of trapezoidal shape is secured in vertical position to the rear edge of the vertical bar, the inner sides of bars 14 and to the rear edge of horizontal bar 22. Small triangular braces 38 are also secured to the lower edges of bars 14, the rear edge of the horizontal bar 22 and the lower outer edges of brace 36. The vertical bar is additionally braced against sidewise movement by a pair of front braces 40 of generally triangular shape secured to the front edges of the vertical and horizontal bars.

The wheel stop is held in position on the rail by the holding means 24 which, however, permit the stop to slide along the rail under car wheel impact. The holding means is best illustrated in Figs. 1, 3, 5 and 6 to which reference is now had. The two holding means are identical in construction and because of this only one will be described in detail and like parts of the other will be indicated by like reference characters. The holding means includes a bolt 42 extending through an aperture in the horizontal bar 22 and having a head 44 provided with an inclined portion 46 adapted to engage the underside of the rail head. The bolt is drawn up by a nut 48 until the head engages the underside of the rail head. The bolts and bolt heads support the wheel stop in vertical position on and prevent it from rising above the top of the rail and the inclined portions of the heads center the stop on the rail.

The bolt is kept properly positioned relative to the rail head by a retainer 50, in the form of a short piece of channel iron secured to the underside of the horizontal bar with the open side of the channel facing the rail and the web lapping under the horizontal bar 22 a distance of about one-eighth inch. In order to prevent the bolt from bending and to maintain the bolt head in contact with the rail head, the side of the bolt head away from the rail is in contact with the web, as best illustrated in Fig. 6. The bolt head also fits fairly closely in the inside of the channel so that, as the stop moves along the rail, the bolt is moved with it. In practice, the bolt is tightened firmly, but even so, the stop will slide along the top of the rail under car wheel impact. The construction is such that the stop slides readily—even more easily than stops provided with loops encircling the entire rail—and, at the same time, is kept upright.

According to another feature of the present invention, the wheel stop is provided with a second wheel abutment, indicated generally by reference character 52, of a height less than that of the first and located forward of the first. This second abutment is constructed and arranged to take both vertical and horizontal thrust whereby it functions to reduce the overturning moment applied to the stop upon car wheel impact and to relieve strain upon the bolts 42 and also reduces wear of the bolt heads 44 engaging the underside of the rail head.

The second wheel abutment 52 is constituted by a short length of steel bar 54 seated upon the top of the rail and rising, preferably, six inches above the top of the rail, and having a width of six inches. The upper forward corner of the abutment is cut at an angle of about 45 degrees to provide a wheel engaging surface 56. The bar is secured, as by welding, to the vertical bar 12 and to the side braces 40.

Figure 7A:
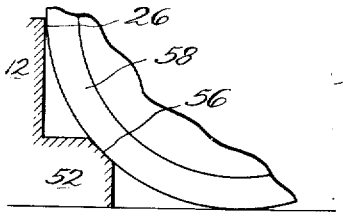
Figs. 7a, 7b and 7c are diagrammatic representations illustrating (a) the cooperative relation between the wheel stop and a wheel of normal size; (b) the cooperative relation between the wheel stop and a wheel smaller than normal traveling at a slow speed; and (c) the cooperative relation between the wheel stop and a wheel smaller than normal traveling at a fairly high speed.
Figure 7B:
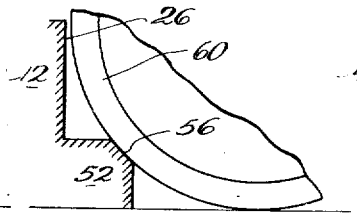
Figure 7C:
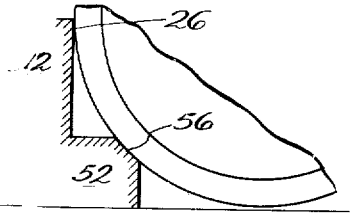

In the described embodiment of the invention, the wheel abutting surfaces 56 and 26 are positioned so that a wheel of normal size, i. e., a wheel having a diameter of 33 inches and the largest size for which the illustrated stop is designed or is intended to be used with, strikes both surfaces at the same time, whereas, a smaller wheel strikes either the surface 56 or both surfaces 56 and 26 dependent upon the speed at which the car is traveling. Referring now to Fig. 7a, it may be noted that a wheel 58 of normal size is shown striking both surfaces 56 and 26 and in contact with the top of the rail. In Fig. 7b, a smaller wheel 60 is shown striking only the forward lower surface 56 and in contact with the top of the rail, which is the case when the wheel is traveling slowly. In Fig. 7c, the smaller wheel 60 is shown striking both surfaces and lifted above the rail, which is the case when the wheel is traveling fast enough to rise on the lower abutment.

From the above detailed description of the wheel stop of the present invention, it may be seen that it may be constructed from metal bars cut into suitable shapes as by a torch or otherwise. The various parts may be readily assembled and welded together to form a wheel stop possessing sufficient strength to enable it to be used on railroads and in locations where it is subjected to hard and continuous use. Furthermore, the stop may be manufactured economically.

In the installation of the wheel stop, the holding bolts 42 are first removed and the stop seated upon a rail with the saddle 16 preferably in abutting relation with a tie 20. After thus seating the stop, it is secured to the rail head by the bolts 42 which are drawn firmly to bring into engagement the inclined bolt head surfaces 46 and the under sides of the rail head. It is customary to use the stops in pairs, so that each rail should be provided with an individual stop and the two so located that they will be struck by a car wheel at the same time.

The wheel stops may be applied to rails of different sizes although they have been illustrated as being applied to but a single size. In the drawings, the rail 18 is of the largest size to which the illustrated wheel stop is applicable. The stop may be applied to smaller sized rails in the same manner as described, inasmuch as the bolt heads serve not only to secure, but also to align, the stop on the smaller sized rail.

In operation, the wheel stop, after being installed on the rail as described above, transmits the car wheel impact to the saddle 16 through the bars 14 and the latter, in turn, transmits the impact to the tie and ballast. The tie and ballast yield more or less depending upon the nature of the ballast as well as upon the force of the impact to provide a cushion stop.

When the wheel stop is struck by a wheel of normal size, the wheel strikes the two wheel abutment surfaces 26 and 56 at the same time. The result is a distribution of the force of the impact between the two abutments and since the lower abutment is formed by an inclined surface, it is subjected to both a horizontal and downward component of force. The downward component of force relieves the strain in the bolts 42 and likewise reduces the overturning moment applied to the stop as a whole.

When the wheel stop is struck by a wheel smaller than the normal size, and it has been found in practice that approximately seven wheels out of eight are smaller than normal size, the car is stopped by the engagement of the car wheel with one or both abutments dependent upon the rate of travel of the car wheel. In the event the car wheel is traveling slowly, it strikes only abutment surface 56, but if it is traveling at a fairly high rate of speed, the wheel will strike abutment surface 56 and climb therealong until it also strikes abutment surface 26. In either event, and as with the case of the normal size wheel, a downward as well as horizontal force is applied to the stop whereby the overturning moment is reduced as is the strain upon the bolts. The reduction in strain on the bolts is particularly advantageous in that the bolt head is forced against the under side of the rail head with a lesser pressure so that, as the stop slides under car wheel impact, there is less wear of the bolt head. Consequently, it is not necessary so often to tighten the bolts to take up slack that may be caused by the wearing of the bolt heads.

When the stop is struck by a wheel, it is probable that the wheel does not continuously bear against the lower forward wheel abutment. The contact may be such that when a car strikes an obstruction on a track such as a wheel stop, everything involved partakes of some movement. This includes the car body, the truck, the obstruction and the track. None of these is static but moves in different ways. It is thus probable that when a car strikes the wheel stop, and especially the upper abutment, the wheels do rise a little in connection with the contortions through which the truck goes. However, contact between the wheel and lower abutment is missing for but one or more separated instances which are not sufficiently long for the overturning moment to act.

If desired, the principles of the present invention may be embodied in a stop wherein the wheel stop defining members and the diverging members are constructed from metal plates. A construction of this character is illustrated in Fig. 8, to which reference will now be had.

Figure 8:
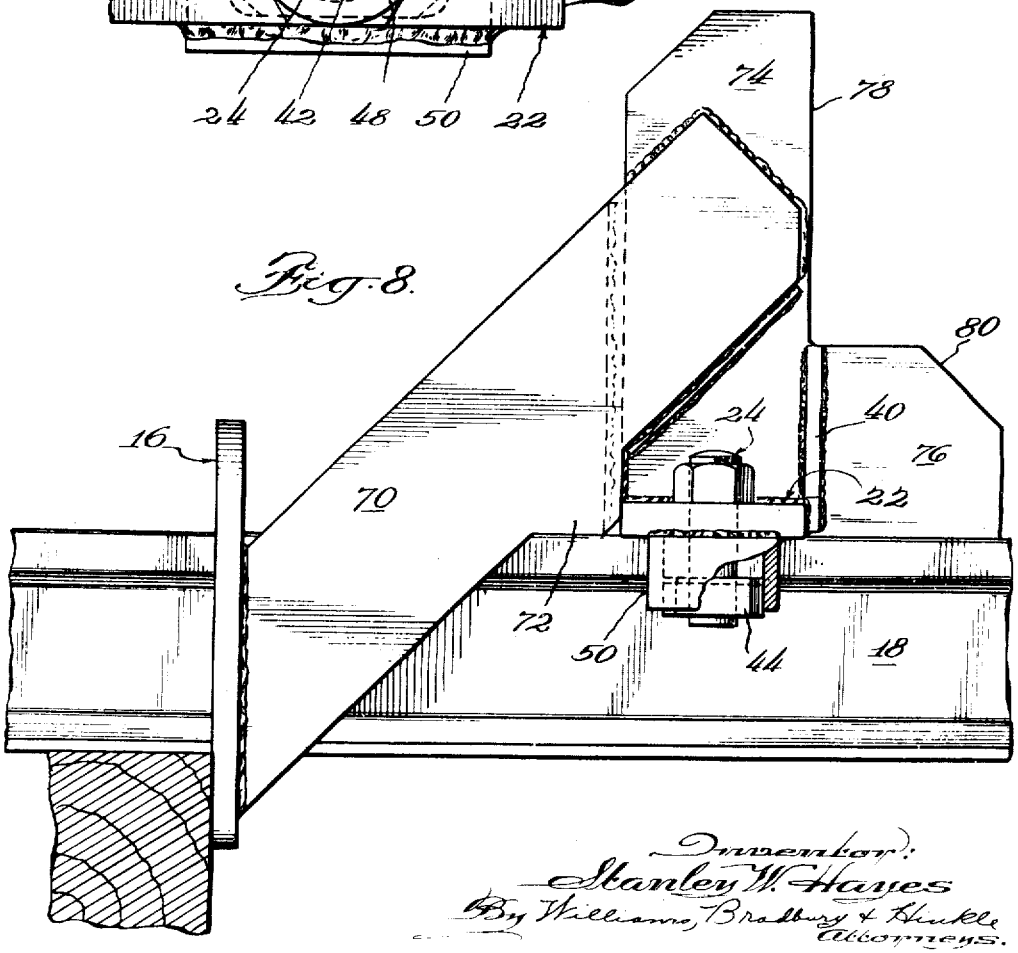
Fig. 8 is a side elevational view of a modified form of wheel stop.

The stop illustrated in Fig. 8 corresponds to that previously described except that the diverging members 70 (only one of which is shown) are cut from metal plate with integral brace defining portions 72 corresponding to the braces 38 of the first embodiment and that the wheel abutments 74 and 76 are integrally formed from a plate cut into the illustrated shape. The main wheel abutment striking surface 78 is constituted by the vertical forward edge of the higher portion of the plate and the second wheel abutment striking surface 80 is constituted by the angularly disposed edge of the lower portion of the plate.

The assembly of the stop of Fig. 8 is somewhat simpler than that of the stop previously described as it requires less welding and no chamfering of joints preparatory to welding. The stop functions in the same manner as the previously described stop and possesses the same advantageous features.

Figure 9:
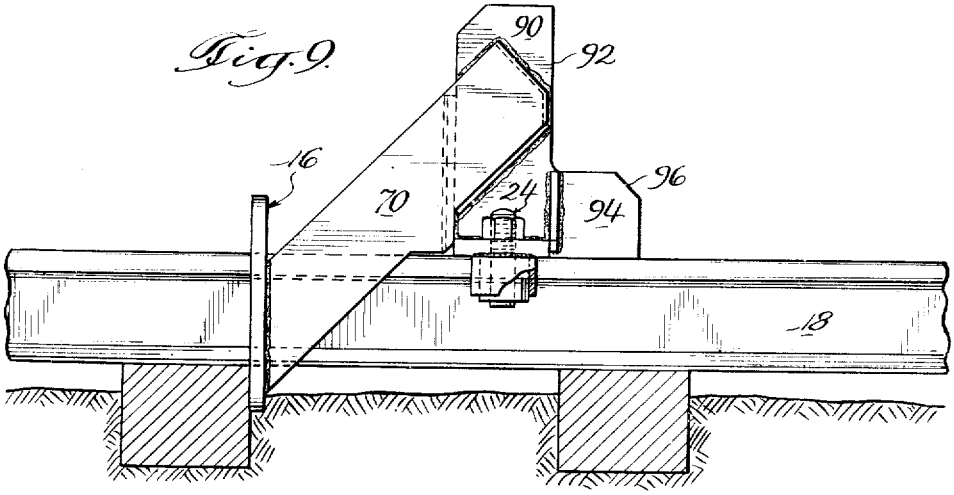
Fig. 9 is a side elevational view of another and preferred embodiment of wheel stop constructed in accordance with the present invention.
Figure 10A:
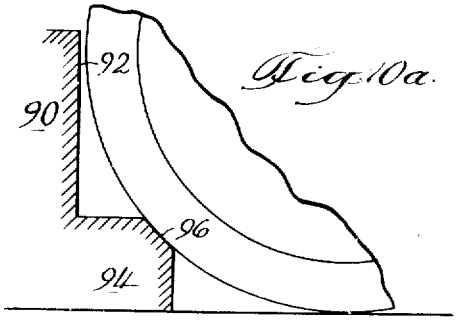
Figs. 10a and 10b are diagrammatic representations illustrating the action of the stop when stopping a wheel of normal or smaller than normal size at (a) lower and (b) higher speeds.
Figure 10B:
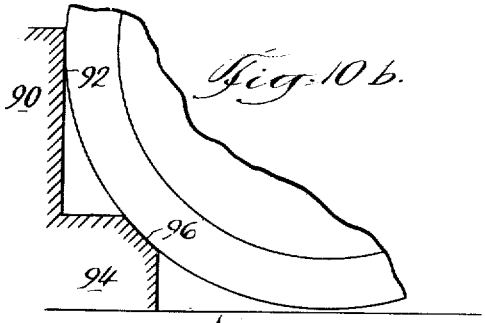

The embodiment of the present invention illustrated in Figs. 9, 10a and 10b, and which is illustrative of a preferred embodiment of the invention, is similar to the wheel stop illustrated in Fig. 8 but has several advantages thereover. The abutment surfaces of this wheel stop are so arranged that even the largest wheel for which the stop is intended or designed will strike the lower abutment first and then, rising slightly above the rail, will strike the upper abutment, provided, of course, it is traveling at a sufficiently high rate of speed.

The embodiment of the invention illustrated in Figs. 9, 10a and 10b has several advantages. In the first place, the two abutments will not have to be placed precisely with respect to each other. This will take care of slight inaccuracies in fabrication of the wheel stop. Furthermore, the lower abutment will function properly even after a certain amount of wear of the abutment surface. While worn wheels will rise somewhat slightly higher above the rail than in the previously described embodiment, there is no objection to this. Such rising is objectionable only if the stops raise the wheels engaging them several inches above the rail—and the objection is the possible bending of the center pin.

Referring now more particularly to Fig. 9, it may be noted that the wheel stop illustrated therein is identical with that shown in Fig. 8 with two exceptions. The first difference is in the raising of the wheel abutment 90 (corresponding to abutment 74) by one-fourth inch, thereby to extend the length of the vertical abutment surface 92 by the same distance. The second difference is in the addition of one-eighth inch of material to the lower abutment 94 (corresponding to abutment 76) in a direction normal to the abutment surface 96.

The operation of the wheel stop of Fig. 9 differs from the operation of those previously described in that both the normal size and worn wheels strike the lower forward abutment surface 96 only if the wheel is traveling at lower speeds and at higher speeds they strike the lower abutment surface 96 first and then the upper abutment surface 92. The lower speed operation is illustrated in Fig. 10a and the higher speed operation is illustrated in Fig. 10b. At the left the wheel engages only the lower abutment surface 96, whereas, at the right the wheel engages both the lower and upper surfaces 96 and 92, respectively.

In all embodiments of the invention illustrated, it may be noted that the upper abutment surface has a configuration such that a wheel striking it will have no substantial tendency to rise therealong. It may be noted further that this configuration is a substantially flat vertical surface. While this configuration is preferred, it should be understood that a forwardly slanting surface could be added to or extended from the vertical surface. Such a surface would not only have no substantial tendency to raise a wheel striking it but it would, in addition, have a tendency to prevent such rising. This modified form of construction has been illustrated and claimed in my Letters Patent No. 2,441,148, issued May 11, 1948.

While the wheel stops have been described as including the two wheel abutments, it should be understood that, if desired, only the main wheel abutment need be utilized. In this event, the wheels of all sizes would strike the abutment surface 26. Tests thus far made have proved a construction of this character to be satisfactory.

It should be understood further that, while it is preferred that the stops be so constructed and arranged as to slide along the rail under car wheel impact, they could be constructed to be secured fixedly to the rail.

What I claim as new and desire to secure by United States Letters Patent is as follows:

1. A car wheel stop adapted to be seated upon a rail, including in combination, a vertically disposed bar above the top of the rail rising substantially to the height of a car wheel axle and forming a car wheel abutment, means including a pair of rearwardly and downwardly extending bars the upper ends of which are secured to said first mentioned bar for transmitting the shock of car wheel impact to the ties and ballast, and means for holding the stop on the rail.

2. A car wheel stop adapted to be seated upon a rail, including in combination, a vertically disposed bar above the top of the rail rising substantially to the height of a car wheel axle and forming a car wheel abutment, a rail saddle consisting of a substantially U-shaped member located to the rear of said bar and extending into the plane of the rail ties and ballast, a pair of rearwardly and downwardly extending bars the upper ends of which are secured to said first mentioned bar above the top of the rail and the lower ends of which are secured to said saddle substantially at the level of the rail for transmitting the shock of car wheel impact to the saddle, ties, and ballast, and means for holding the stop on the rail.

3. A car wheel stop adapted to be seated upon a rail, including in combination, a horizontal bar extending across the top of the rail, a vertically disposed bar secured to said horizontal bar and rising above the top of the rail substantially to the height of a car wheel axle and forming a car wheel abutment, means including a pair of rearwardly and downwardly extending bars the upper ends of which are secured to said vertically disposed bar for transmitting the shock of car wheel impact to the ties and ballast, and means for holding the stop on the rail.

4. A car wheel stop adapted to be seated upon a rail, including in combination, a horizontal bar extending across the top of the rail beyond the sides of the rail head, a vertically disposed bar secured to said horizontal bar and rising above the top of the rail substantially to the height of a car wheel axle and forming a car wheel abutment, means including a pair of rearwardly and downwardly extending bars the upper ends of which are secured to said vertically disposed bar for transmitting the shock of car wheel impact to the ties and ballast, and means mounted on said horizontal bar at opposite sides of the rail head and adapted to engage the under sides of the rail head for holding the stop on the rail.

5. A car wheel stop adapted to be seated upon a rail, including in combination, a horizontal bar extending across the top of the rail beyond the sides of the rail head, a vertically disposed bar secured to said horizontal bar and rising above the top of the rail substantially to the height of a car wheel axle and forming a car wheel abutment, a rail saddle consisting of a substantially U-shaped member located to the rear of said bars and extending into the plane of the rail ties and ballast, a pair of rearwardly and downwardly extending bars the upper ends of which are secured to said vertical bar above the top of the rail and the lower ends of which are secured to said saddle substantially at the level of the rail for transmitting the shock of car wheel impact to the saddle, ties, and ballast, a pair of channel-like members secured to the under side of the horizontal bar at opposite sides of the rail head, with their open sides facing the web of the rail and bolts extending through the horizontal bar for holding the stop on the rail, the bolts having heads fitting into said channel-like members whereby they are prevented from turning and also having head portions adapted to abut against the under sides of the rail head.

6. A car wheel stop adapted to be seated upon a rail, including in combination, a vertically disposed bar rising above the top of the rail substantially to the height of a car wheel axle and forming a car wheel abutment, means including a pair of rearwardly, sidewardly and downwardly extending bars the upper ends of which are secured to said first mentioned bar for transmitting the shock of car wheel impact to the ties and ballast, bracing means associated with the bars and defining therewith a box-like structure, said bracing means including braces at opposite sides of the vertical bar secured to the vertical bar and to the lower edge of the pair of bars on the respective sides of the vertical bar, and a brace secured to the rear edge of the vertical bar and to the inner surfaces of the pair of bars, and means for holding the stop on the rail.

7. A car wheel stop adapted to be seated upon a rail, including in combination, a vertically disposed member seated upon and rising above the top of the rail at least to the height of a car wheel axle and forming a car wheel abutment, means including a pair of rearwardly and downwardly extending members the upper ends of which are secured to said first mentioned member and the lower ends of which extend below the rail for transmitting the shock of car wheel impact to the ties, and means for holding the stop on the rail.

8. A car wheel stop adapted to be seated upon a rail, including in combination, a horizontal member extending transversely across the top of the rail, a vertically disposed member rising above said first mentioned member at least to the height of a car wheel axle and forming a car wheel abutment, means including a pair of rearwardly and downwardly extending members for transmitting the shock of car wheel impact to the ties, the upper ends of said members being secured to said vertically disposed member above said horizontal member and the lower ends extending below the rail and each of said members having an integral projection abutting against the rear edge of said horizontal member, and means associated with said transverse horizontal member for holding the stop on the rail.

9. A car wheel stop adapted to be seated upon a rail, including in combination, a horizontal member extending transversely across the top of the rail, a vertically disposed member rising above said first mentioned member at least to the height of a car wheel axle and forming a car wheel abutment, means including a pair of rearwardly and downwardly extending members connected to the vertically disposed member for transmitting the shock of car wheel impact to the ties, and means for securing said stop to the rail, said last mentioned means including a pair of channel-like members secured to the underside of the horizontal member at opposite sides of the rail head with their open sides facing the web of the rail, and bolts extending through the horizontal member, said bolts having heads engaging the undersides of the rail head and the inner surfaces of the web of the channel-like members.

10. A car wheel stop adapted to be seated upon a rail, including in combination, a horizontal member extending transversely across the top of the rail, a vertically disposed member rising above said first mentioned member at least to the height of a car wheel axle and forming a car wheel abutment, means including a pair of rearwardly and downwardly extending members connected to the vertically disposed member for transmitting the shock of car wheel impact to the ties, and means for securing said stop to the rail, said last mentioned means including a pair of channel-like members secured to the underside of the horizontal member at opposite sides of the rail head with their open sides facing the web of the rail, and bolts extending through the horizontal member, said bolts having heads engaging the undersides of the rail head and fitting closely within the channel-like members.

11. In a wheel stop adapted to be seated upon a rail, structure providing a pair of wheel abutments rising above the top of the rail, one of said abutments including an upper abutment surface having a configuration such and so located that a wheel striking it will have no substantial tendency to rise along the surface, and the other of said abutments including an abutment surface at a lower level and forward of said upper abutment surface, said lower abutment surface having a configuration enabling a wheel to rise therealong and being so located relative to the first mentioned abutment surface that the largest wheels with which the stop may be used strike the upper and lower abutment surfaces substantially simultaneously and smaller wheels strike the upper surface after striking and while in contact with the lower surface, whereby the engagement of the wheel with the lower surface is effective to produce a downward component of force reducing the overturning moment resulting from the impact of a car wheel against either the lower or both abutment surfaces, and means for holding the stop seated upon the rail.

12. In a wheel stop adapted to be seated upon a rail, structure providing a pair of wheel abutments rising above the top of the rail, one of said abutments including an upper abutment surface having a configuration such and so located that a wheel striking it will have no substantial tendency to rise along the surface, and the other of said abutments including an abutment surface at a lower level and forward of said upper abutment surface, said lower abutment surface having a configuration enabling a wheel to rise therealong and being so located relative to the first mentioned abutment surface that the largest wheels with which the stop may be used strike the upper and lower abutment surfaces substantially simultaneously and smaller wheels strike the upper surface after striking and while in contact with the lower surface, whereby the engagement of the wheel with the lower surface is effective to produce a downward component of force reducing the overturning moment resulting from the impact of a car wheel against either the lower or both abutment surfaces, and means secured to said structure near the abutment surfaces having portions adapted slidably to engage the undersides of the rail head at opposite sides of the rail for holding the stop on the rail.

13. In a wheel stop adapted to be seated upon a rail, structure providing a pair of wheel abutments rising above the top of the rail, one of said abutments including an upper substantially vertical abutment surface so that a wheel striking it will have no substantial tendency to rise along the surface, and the other of said abutments including a relatively flat abutment surface at a lower level and forward of said abutment surface, said lower abutment surface having an inclination enabling a wheel to rise therealong and being so located relative to the first mentioned abutment surface that the largest sized wheels with which the stop may be used strike the upper and lower abutment surfaces substantially simultaneously and smaller wheels strike the upper surface after striking and while in contact with the lower surface, whereby the engagement of the wheel with the lower surface is effective to produce a downward component of force reducing the overturning moment resulting from the impact of a car wheel against either the lower or both abutment surfaces, and means for holding the stop seated upon the rail.

14. In a wheel stop of the type adapted to be seated upon and to slide along a rail under car wheel impact and to transmit the shock of car wheel impact to the ballast and ties, structure providing a pair of wheel abutments rising above the top of the rail, one of said abutments including an upper substantially vertical abutment surface so that a wheel striking it will have no substantial tendency to rise along the surface, and the other of said abutments including an abutment surface at a lower level and forward of said upper abutment surface, said lower abutment surface having an inclination enabling a wheel to rise therealong and being so located relative to the first mentioned abutment surface that the largest sized wheels with which the stop may be used strike the upper and lower abutment surfaces simultaneously and smaller wheels strike the upper surface after striking and while in contact with the lower surface, whereby the engagement of the wheel with the lower surface is effective to produce a downward component of force reducing the overturning moment resulting from the impact of a car wheel against either the lower or both abutment surfaces, and means secured to said structure near the abutment surfaces and having portions adapted slidably to engage the undersides of the rail head at opposite sides of the rail for holding the stop on the rail.

15. In a wheel stop adapted to be seated upon a rail, a first wheel abutment comprising structure rising above the top of a rail to a height substantially less than the height of the wheel axle and having an abutment surface configured to enable a wheel to rise therealong, a second wheel abutment comprising structure connected to the first structure having a second abutment surface located to the rear of the first and at substantially the height of the wheel axle, said second abutment surface being configured so that a wheel striking it will not rise therealong, and said surfaces being so located that the largest size of wheel for which the stop is primarily designed strikes both abutment surfaces substantially simultaneously, and means for holding the stop seated upon the rail.

16. In a wheel stop adapted to be seated upon a rail, a first wheel abutment comprising structure rising above the top of a rail to a height substantially less than the height of the wheel axle and having an abutment surface configured to enable a wheel to rise therealong, a second wheel abutment comprising structure connected to the first structure having a second abutment surface located to the rear of the first and at substantially the height of the wheel axle, said second abutment surface being configured so that a wheel striking it will not rise therealong, and said surfaces being so located that the normal size of wheel for which the stop is primarily designed strikes both abutment surfaces substantially simultaneously and a worn wheel strikes either the first abutment surface or the first and second abutment surfaces depending on the speed of travel of the wheel, and means for holding the stop seated upon the rail.

17. In a wheel stop adapted to be seated upon a rail, a first wheel abutment comprising structure seated upon and rising above the top of a rail to a height substantially less than the height of the wheel axle and having an abutment surface inclined at about 45 degrees, and a second wheel abutment comprising structure connected to the first structure and having a substantially vertical abutment surface located to the rear of the first and at substantially the height of the wheel axle, said surfaces being so located lengthwise of the rail that the largest size of wheel for which the stop is primarily designed strikes the abutment surfaces substantially simultaneously, means including a pair of rearwardly and downwardly extending members the upper ends of which are secured to said second abutment structure near the vertical abutment surface and the lower ends of which extend below the rail for transmitting the shock of car wheel impact to the ties and ballast, and means including structure extending horizontally outwardly from the second abutment structure at the level of the top of the rail and rail head clamping means detachably secured thereto for holding the stop on the rail.

18. In a wheel stop adapted to be seated upon a rail, a pair of wheel abutments rising above the top of the rail, one of said abutments having a substantially vertical abutment surface located substantially at the height of a car wheel axle, and the other of said abutments being located forward of and lower than said one abutment, said other abutment having an abutment surface with an inclination of about 45 degrees, said surfaces being so located that wheels of the largest size for which the stop is primarily designed strike both surfaces at substantially the same time and smaller wheels strike said other abutment surface only or both surfaces, and means for holding the stop seated upon the rail.

19. In a wheel stop adapted to be seated upon a rail, a first wheel abutment comprising a bar rising above the top of a rail to a height substantially less than the height of the wheel axle and having an inclined wheel abutting surface, a second wheel abutment secured to the first comprising a vertical bar located to the rear of the first and rising above the rail to a height substantially that of the wheel axle, the angle of inclination of said abutting surface and the spacing of the bars being such that a wheel of normal size strikes the inclined abutting surface of the first abutment and the vertical forward edge of the second abutment at substantially the same time, and means for holding the stop seated upon the rail.

20. A wheel stop adapted to be seated upon a rail, including in combination, a first wheel abutment comprising a bar rising above the top of a rail to a height substantially less than the height of the wheel axle and having an inclined wheel abutting surface, a second wheel abutment secured to the first comprising a vertical bar located to the rear of the first and rising above the rail to a height substantially that of the wheel axle, the angle of inclination of said abutting surface and the spacing of the bars being such that a wheel of normal size strikes both at substantially the same time, means including a pair of rearwardly and downwardly extending bars the upper ends of which are secured to said vertical bar for transmitting the shock of car wheel impact to the ties and ballast, and means adapted to hold the stop seated on a rail.

21. A car wheel stop adapted to be seated upon a rail, including in combination, a horizontal bar extending across the top of the rail beyond the sides of the rail head, a vertically disposed bar secured to the top of said horizontal bar and rising above the top of the rail substantially to the height of a car wheel axle and forming a car wheel abutment, a second wheel abutment comprising a vertical bar secured to the front edges of both said vertical and horizontal bars and rising to a height substantially less than the height of the wheel axle, means including a pair of rearwardly and downwardly extending bars the upper ends of which are secured to said vertical bar for transmitting the shock of car wheel impact to the ties and ballast, and means movably mounted in said horizontal bar at opposite sides of the rail head and adapted to engage the undersides of the rail head for holding the stop on the rail.

22. In a wheel stop adapted to be seated upon a rail, an integral metallic plate providing a pair of wheel abutments rising above the top of the rail, one of said abutments including an upper abutment surface at substantially the level of the car wheel axle and having a configuration such that a wheel striking it will have no substantial tendency to rise along the surface, and the other of said abutments including an abutment surface at a lower level and forward of said upper abutment surface, said lower abutment surface having a configuration enabling a wheel to rise therealong and being so located relative to the first mentioned abutment surface that wheels for which the stop is designed strike the upper and lower abutment surfaces simultaneously or the upper surface after striking and while in contact with the lower surface, whereby the engagement of the wheel with the lower surface produces a downward component of force reducing the overturning moment resulting from the impact of a car wheel against either the lower or both abutment surfaces, and means for holding the stop seated upon the rail.

23. In a wheel stop adapted to be seated upon a rail, an integral metallic plate providing a pair of wheel abutments rising above the top of the rail, one of said abutments including an upper abutment surface at substantially the level of the car wheel axle and having a configuration such that a wheel striking it will have no substantial tendency to rise along the surface, and the other of said abutments including an abutment surface at a lower level and forward of said upper abutment surface, said lower abutment surface having a configuration enabling a wheel to rise therealong and being so located relative to the first mentioned abutment surface that wheels for which the stop is designed strike the upper and lower abutment surfaces simultaneously or the upper surface after striking and while in contact with the lower surface, whereby the engagement of the wheel with the lower surface produces a downward component of force reducing the overturning moment resulting fom the impact of a car wheel against either the lower or both abutment surfaces, means including a pair of rearwardly and downwardly extending members the upper ends of which are secured to said plate near the upper abutment surface and the lower ends of which extend below the level of the rail for transmitting the shock of car wheel impact to the ties and ballast, and means including structure extending horizontally outwardly from the plate at the level of the top of the rail and rail head clamping means detachably secured thereto for holding the stop on the rail.

24. In a wheel stop adapted to be seated upon a rail, a first wheel abutment comprising structure rising above the top of a rail to a height substantially less than the height of the wheel axle and having an abutment surface configured to enable a wheel to rise therealong, a second wheel abutment comprising structure connected to the first structure defining a second abutment surface located to the rear of the first and at a height above that of the wheel axle, said second abutment surface being configured so that a wheel striking it will not rise therealong, and said surfaces being so located that the largest size of wheel for which the stop is primarily designed strikes the first abutment surface only at lower speeds of travel and the first abutment surface first and then rises therealong and also strikes the second surface at higher speeds of travel of the wheel, and means for holding the stop seated upon the rail.

25. In a wheel stop adapted to be seated upon a rail, a first wheel abutment comprising structure rising above the top of a rail to a height substantially less than the height of the wheel axle and having an inclined abutment surface, a second wheel abutment comprising structure connected to the first structure defining a second and generally vertical abutment surface located to the rear of the first and at a height above that of the wheel axle, the angle of inclination of said first abutment surface and the location of said surfaces being such that the largest size of wheel for which the stop is primarily designed strikes the inclined abutment surface only at lower speeds of travel and the inclined abutment surface first and then rises therealong and also strikes the second surface at higher speeds of travel of the wheel, and means for holding the stop seated upon the rail.

26. In a wheel stop adapted to be seated upon a rail, a first wheel abutment comprising structure seated upon and rising above the top of a rail to a height substantially less than the height of the wheel axle and having an abutment surface inclined at about 45 degrees, and a second wheel abutment comprising structure connected to the first structure and having a substantially vertical abutment surface located to the rear of the first and at a height slightly above that of the wheel axle, said surfaces being so located lengthwise of the rail that the largest size of wheel for which the stop is primarily designed strikes the inclined abutment surface only at lower speeds of travel and the inclined abutment surface first and then rises therealong and also strikes the second surface at higher speeds of travel of the wheel, means including a pair of rearwardly and downwardly extending members the upper ends of which are secured to said second abutment structure near the vertical abutment surface and the lower ends of which extend below the rail for transmitting the shock of car wheel impact to the ties and ballast, and means including structure extending horizontally outwardly from the second abutment structure at the level of the top of the rail and rail head clamping means detachably secured thereto for holding the stop on the rail.

27. In a wheel stop adapted to be seated upon a rail, structure providing a pair of wheel abutments rising above the top of the rail, one of said abutments including an upper abutment surface slightly above the level of the car wheel axle and having a configuration such that a wheel striking it will not rise along the surface, and the other of said abutments including an abutment surface at a lower level and forward of said upper abutment surface, said lower abutment surface having a configuration enabling a wheel to rise therealong and being so located relative to the first mentioned abutment surface that wheels for which the stop is primarily designed strike the upper surface after striking and while in engagement with the lower surface, whereby the engagement of the wheel with the lower surface produces a downward component of force reducing the overturning moment resulting from the impact of a car wheel against either the lower or both abutment surfaces, and means for holding the stop seated upon the rail.

28. In a wheel stop adapted to be seated upon a rail, a first wheel abutment comprising structure rising above the top of a rail to a height substantially less than the height of a wheel axle and having an abutment surface configured to enable a wheel to rise therealong, a second wheel abutment comprising structure connected to the first structure defining a second abutment surface located to the rear and above the first, said second abutment surface being configured so that a wheel striking it will not rise therealong, said surfaces being so located that the largest wheels with which the stop may be used strike the two abutment surfaces substantially simultaneously and smaller wheels strike the upper surface after striking and rising along but in contact with the lower surface, whereby the engagement with the lower surface is effective to produce a downward component of force reducing the overturning moment resulting from the impact of a car wheel against either the lower or both abutment surfaces, and means slidably securing said abutment defining structures to the rail.

29. A wheel stop having an abutment surface adapted to be located above the rail engageable by a wheel and subject to an overturning moment when engaged by a wheel and adapted to slide lengthwise of the rail under car wheel impact, characterized in that the stop includes substantially vertically extending means having structure engageable with the opposite undersides of and only substantially vertically adjustable relative to the rail head for offsetting the overturning moment, and means extending below the rail head engaging said structure of said first mentioned means for preventing movement thereof lengthwise of the rail relative to the stop.

30. A wheel stop having an abutment surface adapted to be located above the rail engageable by a wheel and subject to an overturning moment when engaged by a wheel, characterized in that the stop includes a pair of substantially vertically extending bolts having heads engaging the opposite undersides of the rail head for offsetting the overturning moment, and channel-like members closely receiving the bolt heads for preventing movement of the bolt heads lengthwise of the rail relative to the stop.

31. A wheel stop having an abutment surface adapted to be located above the rail engageable by a wheel and subject to an overturning moment when engaged by a wheel, characterized in that the stop includes substantially vertically extending and only vertically adjustable means at the opposite sides of the rail, said means each including structure adapted to have substantial but sliding engagement with the underside of the rail head at its side of the rail, whereby said structures are adapted slidingly to engage the opposite undersides of the rail head to offset overturning moment and to hold the wheel stop vertically relative to the rail.

32. A wheel stop having an abutment surface adapted to be located above the rail engageable by a wheel and subject to an overturning moment when engaged by a wheel characterized in that the stop includes independent and removable substantially vertically extending and only substantially vertically adjustable means at the opposite sides of the rail, said means each including structure adapted to have substantial but sliding engagement with the underside of the rail head at its side of the rail, whereby said structures are adapted slidingly to engage the opposite undersides of the rail head to offset overturning moment and to hold the wheel stop vertically relative to the rail.

33. A wheel stop having an abutment surface adapted to be located above the rail engageable by a wheel and subject to an overturning moment when engaged by a wheel, characterized in that the stop includes substantially vertically extending and only vertically adjustable bolts at the opposite sides of the rail, said bolts each having a bolt head with an inclined surface adapted to have substantial but sliding engagement with the underside of the rail head at its side of the rail, whereby said bolts are adapted slidingly to engage the opposite undersides of the rail head to effect overturning moment, and to center and to hold the wheel stop vertically relative to the rail.

*34. A wheel stop having an abutment surface located above the rail engageable by a wheel and subject to an overturning moment when engaged by a wheel and adapted to slide lengthwise of the rail under car wheel impact, characterized in that the stop includes structure extending laterally beyond and apertured at the opposite sides of the rail head and above the rail head, and substantially vertically arranged bolts passing axially through and only axially adjustable in the apertures in said structure at the opposite sides of the stop having heads underneath the rail head and movable axially slidingly to engage the opposite undersides of the rail head for offsetting the overturning moment and holding the stop vertical.*

*35. A wheel stop having an abutment surface located above the rail engageable by a wheel and subject to an overturning moment when engaged by a wheel and adapted to slide lengthwise of the rail under car wheel impact, including structure extending laterally beyond the opposite sides of the rail head, said structure being apertured at each side of the stop with the axis of each aperture extending from above to below said structure, and stop holding means at each side of said stop for offsetting the overturning moment and holding the stop vertical, said stop holding means including members at opposite sides of the stop passing through and each movable in its associated aperture, each of said members having a rail head engaging portion movable only axially of its associated aperture and adapted slidingly to engage the adjacent underside of the rail head, and means associated with each of said members for moving its rail head engaging portion axially against the underside of the rail.*

*36. A wheel stop having an abutment surface located above the rail engageable by a wheel and subject to an overturning moment when engaged by a wheel and adapted to slide lengthwise of the rail under car wheel impact, including structure extending laterally beyond the opposite sides of the rail head, said structure being apertured at each side of the stop with the axis of each aperture extending from above to below said structure, stop holding means at each side of said stop for offsetting the overturning moment and holding the stop vertical, said stop holding means including members at opposite sides of the stop passing through and each movable in its associated aperture, each of said members having a rail head engaging portion movable only axially of its associated aperture and adapted slidingly to engage the adjacent underside of the rail head and means associated with each*

*of said members for moving its rail head engaging portion axially against the underside of the rail, and rail head engaging portion embracing retainer members secured to the underside of said laterally extending structure at opposite sides of the stop and depending therefrom to below the rail head for preventing movement of the rail head engaging portions lengthwise of the rail relative to the stop.*

*37. A wheel stop having an abutment surface located above the rail engageable by a wheel and subject to an overturning moment when engaged by a wheel and adapted to slide lengthwise of the rail under car wheel impact, characterized in that the stop includes structure extending laterally beyond the opposite sides of the rail head and bolts passing through said structure at the opposite sides of the stop having heads with inclined surfaces adapted slidingly to engage the opposite undersides of the rail head for offsetting the overturning moment and holding the stop vertical, and channel-like members secured to and depending below said laterally extending structure at the opposite sides of the rail head closely receiving the heads of the bolts for preventing movement of the bolt heads lengthwise of the rail relative to the stop.*

STANLEY W. HAYES.

No references cited.

Certificate of Correction

Reissue No. 23,180 December 6, 1949

STANLEY W. HAYES

It is hereby certified that error appears in the printed specification of the above numbered patent requiring correction as follows:

Column 16, line 17, for the word "effect" read *offset*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*